(12) United States Patent
Liu et al.

(10) Patent No.: US 12,437,472 B2
(45) Date of Patent: Oct. 7, 2025

(54) METHOD, DEVICE, AND COMPUTER PROGRAM PRODUCT FOR RENDERING

(71) Applicant: Dell Products L.P., Round Rock, TX (US)

(72) Inventors: Zhisong Liu, Shenzhen (CN); Zijia Wang, Weifang (CN); Zhen Jia, Shanghai (CN)

(73) Assignee: Dell Products L.P., Round Rock, TX (US)

( * ) Notice: Subject to any disclaimer, the term of this patent is extended or adjusted under 35 U.S.C. 154(b) by 283 days.

(21) Appl. No.: 18/144,289

(22) Filed: May 8, 2023

(65) Prior Publication Data

US 2024/0346750 A1 Oct. 17, 2024

(30) Foreign Application Priority Data

Apr. 14, 2023 (CN) .......................... 202310402584.4

(51) Int. Cl.
| | |
|---|---|
| *G06T 17/00* | (2006.01) |
| *G06T 7/70* | (2017.01) |
| *G06V 10/44* | (2022.01) |
| *G06V 10/74* | (2022.01) |
| *G06V 10/771* | (2022.01) |

(52) U.S. Cl.
CPC ................ *G06T 17/00* (2013.01); *G06T 7/70* (2017.01); *G06V 10/44* (2022.01); *G06V 10/761* (2022.01); *G06V 10/771* (2022.01); *G06T 2207/10024* (2013.01); *G06T 2207/20081* (2013.01); *G06T 2207/30244* (2013.01)

(58) Field of Classification Search
CPC ..... G06T 15/506; G06T 15/503; G06T 15/20; G06T 7/70; G06T 17/00; G06T 2207/30244; G06T 2207/10024; G06T 2207/20081; G06T 19/006; G06T 2207/10028; G06V 10/761; G06V 10/771; G06V 10/44; G06V 20/20; G06F 3/0346; G06F 3/04815
See application file for complete search history.

(56) References Cited

U.S. PATENT DOCUMENTS

2022/0245882 A1* 8/2022 Spring .................... G06T 15/00
2024/0087162 A1* 3/2024 Araújo ...................... G06T 7/11

OTHER PUBLICATIONS

B. Mildenhall et al., "NeRF: Representing Scenes as Neural Radiance Fields for View Synthesis," European Conference on Computer Vision, Aug. 2020, 17 pages.

(Continued)

*Primary Examiner* — Xilin Guo
(74) *Attorney, Agent, or Firm* — Ryan, Mason & Lewis, LLP (57) ABSTRACT

Embodiments of the present disclosure relate to a method, a device, and a computer program product for rendering. The method includes obtaining features of a three-dimensional (3D) graph based on the 3D graph and a pose of a camera capturing the 3D graph. The method further includes generating a plurality of two-dimensional (2D) subgraphs for the 3D graph based on the features of the 3D graph, wherein the plurality of 2D subgraphs are adjustable. The method further includes rendering a scene in the 3D graph based on the generated plurality of 2D subgraphs. In this way, customization of a rendering process can be achieved, and visual quality during scene decomposition and synthesis can be improved, thereby enhancing 3D reconstruction.

20 Claims, 7 Drawing Sheets

(56) References Cited

OTHER PUBLICATIONS

T. Müller et al., "Instant Neural Graphics Primitives with a Multiresolution Hash Encoding," arXiv:2201.05989v2, May 4, 2022, 15 pages.
J. T. Barron et al., "Mip-NeRF 360: Unbounded Anti-Aliased Neural Radiance Fields," Conference on Computer Vision and Pattern Recognition, arXiv:2111.12077v3, Mar. 25, 2022, 18 pages.
G. Gafni et al., "Dynamic Neural Radiance Fields for Monocular 4D Facial Avatar Reconstruction," IEEE/CVF Conference on Computer Vision and Pattern Recognition, Jun. 2021, pp. 8649-8658.
S. Liu et al., "Editing Conditional Radiance Fields," International Conference on Computer Vision, arXiv:2105.06466v2, Jun. 4, 2021, 24 pages.
C. Wang et al., "CLIP-NeRF: Text-and-Image Driven Manipulation of Neural Radiance Fields," arXiv:2112.05139v3, Mar. 2, 2022, 13 pages.
A. Radford et al., "Learning Transferable Visual Models From Natural Language Supervision," International Conference on Machine Learning, arXiv:2103.00020v1, Feb. 26, 2021, 48 pages.
S. Zhi et al., "In-Place Scene Labelling and Understanding with Implicit Scene Representation," International Conference on Computer Vision, arXiv:2103.15875v2, Aug. 21, 2021, 14 pages.
S. Kobayashi et al., "Decomposing NeRF for Editing via Feature Field Distillation," arXiv:2205.15585v1, May 31, 2022, 23 pages.
M. Boss et al., "NeRD: Neural Reflectance Decomposition from Image Collections," IEEE/CVF International Conference on Computer Vision (ICCV), Oct. 2021, pp. 12684-12694.
X. Zhang et al., "NeRFactor: Neural Factorization of Shape and Reflectance under an Unknown Illumination," ACM Transactions on Graphics, vol. 40, No. 6, Dec. 2021, pp. 237:1-237:18.
V. Rudnev et al., "NeRF for Outdoor Scene Relighting," 17th European Conference on Computer Vision, Oct. 2022, 17 pages.
I. Mehta et al., "Modulated Periodic Activations for Generalizable Local Functional Representations," IEEE/CVF International Conference on Computer Vision (ICCV), Oct. 2021, pp. 14214-14223.
R. Basri et al., "Lambertian Reflectance and Linear Subspaces," Weizmann Institute of Science, Technical Report MCS00-21, NEC Research Institute Technical Report 2000-172R, Mar. 2023, 27 pages.
B. Li et al., "Language-driven Semantic Segmentation," International Conference on Learning Representations, arXiv:2201.03546v2, Apr. 3, 2022, 13 pages.
M. Caron et al., "Emerging Properties in Self-Supervised Vision Transformers," IEEE/CVF Conference on Computer Vision and Pattern Recognition. Jun. 2021, pp. 9650-9660.
U.S. Appl. No. 17/984,474 filed in the name of Zhisong Liu et al. filed Nov. 10, 2022, and entitled "Method, Electronic Device, and Computer Program Product for Generating Three-Dimensional Scene."

\* cited by examiner

METHOD, DEVICE, AND COMPUTER PROGRAM PRODUCT FOR RENDERING

RELATED APPLICATION

The present application claims priority to Chinese Patent Application No. 202310402584.4, filed Apr. 14, 2023, and entitled "Method, Device, and Computer Program Product for Rendering," which is incorporated by reference herein in its entirety.

FIELD

Embodiments of the present disclosure generally relate to the field of computers, and more particularly, to a method, an electronic device, and a computer program product for rendering.

BACKGROUND

The metaverse is a new trend that will lead mankind into a new digital era, where people can obtain authentic and extreme experiences. In the metaverse, a virtual world is constructed using digital technologies, which is mapped by the real world or transcends the real world, and can interact with the real world.

For building a realistic virtual world in the metaverse, accurate modeling is essential. Accordingly, a need exists for a powerful and efficient rendering process.

SUMMARY

Embodiments of the present disclosure provide a solution for rendering.

In a first aspect of the present disclosure, a method for rendering is provided, and the method includes obtaining features of a three-dimensional (3D) graph based on the 3D graph and a pose of a camera capturing the 3D graph. The method further includes generating a plurality of two-dimensional (2D) subgraphs for the 3D graph based on the features of the 3D graph, wherein the plurality of 2D subgraphs are adjustable. The method further includes rendering a scene in the 3D graph based on the generated plurality of 2D subgraphs.

In another aspect of the present disclosure, an electronic device for rendering is provided. The electronic device includes a processor and a memory, wherein the memory is coupled to the processor and stores instructions, and the instructions, when executed by the processor, cause the electronic device to perform the following actions: obtaining features of a 3D graph based on the 3D graph and a pose of a camera capturing the 3D graph. The actions further include generating a plurality of 2D subgraphs for the 3D graph based on the features of the 3D graph, wherein the plurality of 2D subgraphs are adjustable. The actions further include rendering a scene in the 3D graph based on the generated plurality of 2D subgraphs.

In still another aspect of the present disclosure, a computer program product is provided. The computer program product is tangibly stored on a non-transitory computer-readable storage medium and includes computer-executable instructions, wherein the computer-executable instructions, when executed by a computer, cause the computer to perform the method or process according to embodiments of the present disclosure.

It should be noted that this Summary is provided to introduce a series of concepts in a simplified manner, which will be further described in the Detailed Description below. The Summary is neither intended to identify key features or necessary features of the present disclosure, nor intended to limit the scope of the present disclosure.

BRIEF DESCRIPTION OF THE DRAWINGS

By Description of Embodiments of the Present Disclosure, Provided in More Detail Herein with Reference to the Accompanying Drawings, the Above and Other Objectives, Features, and Advantages of the Present Disclosure Will Become More Apparent, where.

Throughout all the drawings, the same or similar reference numerals generally represent the same or similar elements.

DETAILED DESCRIPTION

Illustrative embodiments of the present disclosure will be described in more detail below with reference to the accompanying drawings. Although some embodiments of the present disclosure are shown in the accompanying drawings, it should be understood that the present disclosure may be implemented in various forms and should not be construed as limited to the embodiments described herein. Rather, these embodiments are provided for a more thorough and complete understanding of the present disclosure. It should be understood that the accompanying drawings and embodiments of the present disclosure are for illustrative purposes only, and are not intended to limit the protection scope of the present disclosure.

In the description of embodiments of the present disclosure, the term "include" and its variations should be understood as open-ended inclusion, i.e., "including but not limited to." The term "based on" should be understood as "based at least in part on." The term "an embodiment" or "the embodiment" should be understood as "at least one embodiment." The terms "first," "second," and the like may refer to different or identical objects, unless otherwise specifically indicated.

As described above, the metaverse is increasingly receiving public attention as a new trend. The metaverse provides virtual worlds constructed using digital technologies, which are mapped by the real world or transcend the real world, and can interact with the real world. In order to construct a realistic virtual world in the metaverse, accurate 3D modeling of scenes and/or objects is required.

Human-computer interaction is one of the important technologies used for achieving immersive metaverse experiences, and illustratively involves introducing interactive operations to allow a user to customize a 3D modeling process. Furthermore, the interactive operations allow the user to customize a 3D rendering process. For such an editable 3D rendering process, the ability of editing is associated with scene decomposition.

The appearance of a photo of a given object depends on factors such as object color, environmental reflection (lighting), and shadows. For example, when the light source is located in different position conditions, photos taken exhibit different shadow effects. The factors that affect the rendering process include not only shadows, but also color and depth. The color described herein may be a pure color, also referred to as albedo, which indicates the color of the object itself after removing the influence of an external light source. In addition, the depth described herein may also be referred to as density, indicating a 3D structure of the object itself after removing the influence of color and lighting.

Some existing 3D rendering methods do not consider the influence of camera posture and cannot decompose object shapes, making it difficult for networks to learn. Some other 3D rendering methods cannot explore 3D geometry used for scene synthesis, and they result in inconsistent scene changes.

To solve at least the above and other potential problems, an embodiment of the present disclosure provides a method for rendering. The solution provided in such an embodiment includes obtaining features of a 3D graph based on the 3D graph and a pose of a camera capturing the 3D graph. The solution further includes generating a plurality of 2D subgraphs for the 3D graph based on the features of the 3D graph, wherein the plurality of 2D subgraphs are adjustable. The solution further includes rendering a scene in the 3D graph based on the generated plurality of 2D subgraphs. In this way, customization of a rendering process can be achieved to manipulate a 3D scene and improve visual quality during scene decomposition and synthesis, thereby enhancing 3D reconstruction.

Basic principles and some example embodiments of the present disclosure are illustrated below with reference to FIG. 1 to FIG. 7. It should be understood that these example embodiments are given only to enable those skilled in the art to better understand and thus implement embodiments of the present disclosure, and are not intended to limit the scope of the present disclosure in any way.

Figure 1:
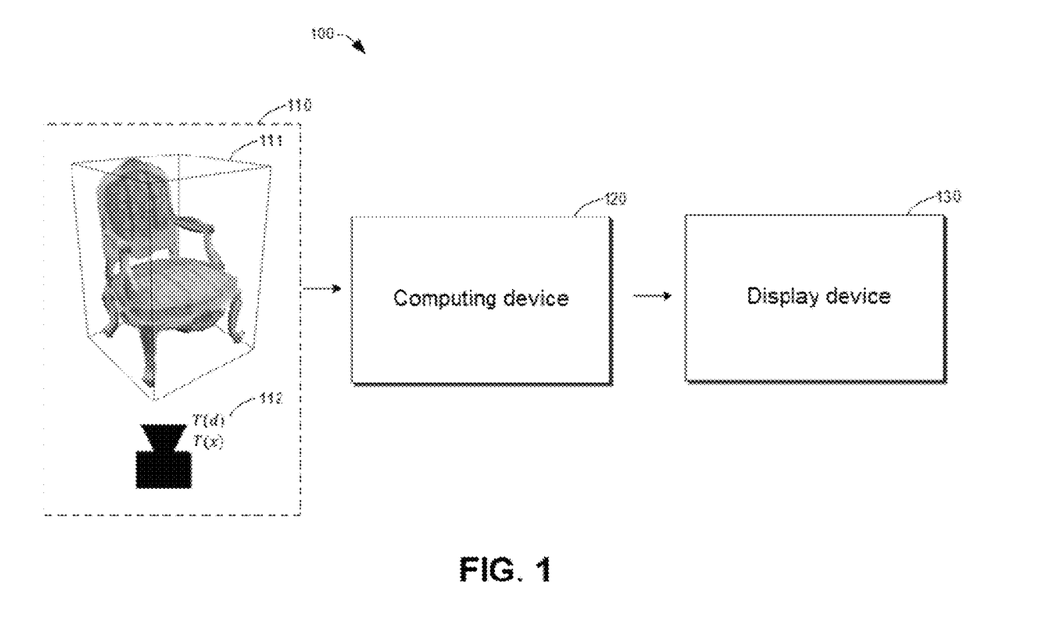
FIG. 1 is a schematic diagram of an example environment in which a method and/or process according to an illustrative embodiment of the present disclosure can be implemented.

FIG. 1 is a schematic diagram of an example environment 100 in which a method and/or process according to an embodiment of the present disclosure can be implemented. In the example environment 100, a 3D graph 111 and a pose 112 of a camera capturing the 3D graph 111 may be input as an input 110 to a rendering model according to an embodiment of the present disclosure at a computing device 120. Corresponding calculations (such as a rendering process described below) are performed through the rendering model at the computing device 120 to achieve 3D scene manipulation according to an embodiment of the present disclosure. A rendered scene is displayed at a display device 130.

According to an embodiment of the present disclosure, the input 110 may include the 3D graph 111 captured by the camera in a certain pose 112. The pose 112 of the camera may include an orientation T(x) and a posture T(d) (also referred to as a camera orientation and a camera posture) of the camera. Here, FIG. 1 illustrates the rendering process according to an embodiment of the present disclosure by taking a single 3D graph and a pose of a camera corresponding to the 3D graph as an example of the input 110. However, it should be noted that the dimensions, number, and types of graphs included in the input 110 are not limited in the present disclosure. In other words, the input 110 may include, for example, one or a plurality of graphs with more or fewer dimensions, such as one 2D graph and two 3D graphs. It should also be noted that the camera is illustrative, and the input 110 may also be captured by other different image sensors, which is not limited by the present disclosure.

The computing device 120 may be any device with a computing capability. According to an embodiment of the present disclosure, after receiving the input 110 as described above, the computing device 120 performs corresponding calculations through the rendering model on it, so as to achieve 3D scene manipulation according to an embodiment of the present disclosure. An example of the computing device 120 may include a smartphone, a tablet, a personal computer, a laptop, a server computer, a multiprocessor system, a wearable electronic device, a multimedia player, a personal digital assistant (PDA), a smart home device, a consumer electronic product, and the like. The example of the computing device 120 may further include a distributed computing environment that includes any of the aforementioned systems or devices.

After completing the rendering process according to an embodiment of the present disclosure, the scene in the 3D graph 111 is rendered and transmitted to the display device 130 for display. The display device 130 may be any device with a displaying capability. According to embodiments of the present disclosure, the display device may be a display specifically designed for display, such as a television or projector, or may be an electronic device with a display unit, such as a smartphone or a smart watch. It should be noted that the arrangements of the computing device 120 and the display device 130 shown in FIG. 1 are illustrative, and the present disclosure is not limited to such arrangements. In another example, the display device 130 may be located in the computing device 120, and after receiving the input 110 and performing corresponding calculations, the computing device 120 transmits the scene in the rendered 3D graph for which the rendering process according to an embodiment of the present disclosure has been completed to the display device 130 located in it for display. In this way, there is no longer a need for a separate display device. It should also be noted that the above examples are not intended to be restrictive, but are only illustrative for the purpose of assisting understanding, and embodiments of the present disclosure are not limited to the examples shown above.

A schematic diagram of the example environment 100 in which a method and/or process according to an embodiment of the present disclosure may be implemented has been described above with reference to FIG. 1. A flow chart of a method 200 for rendering according to an embodiment of the present disclosure will be described below with reference to FIG. 2. As described above for the computing device 120, the method 200 for rendering according to an embodiment of the present disclosure may be performed at an edge device with a computing capability, or performed at a cloud server, which is not limited in the present disclosure.

Figure 2:
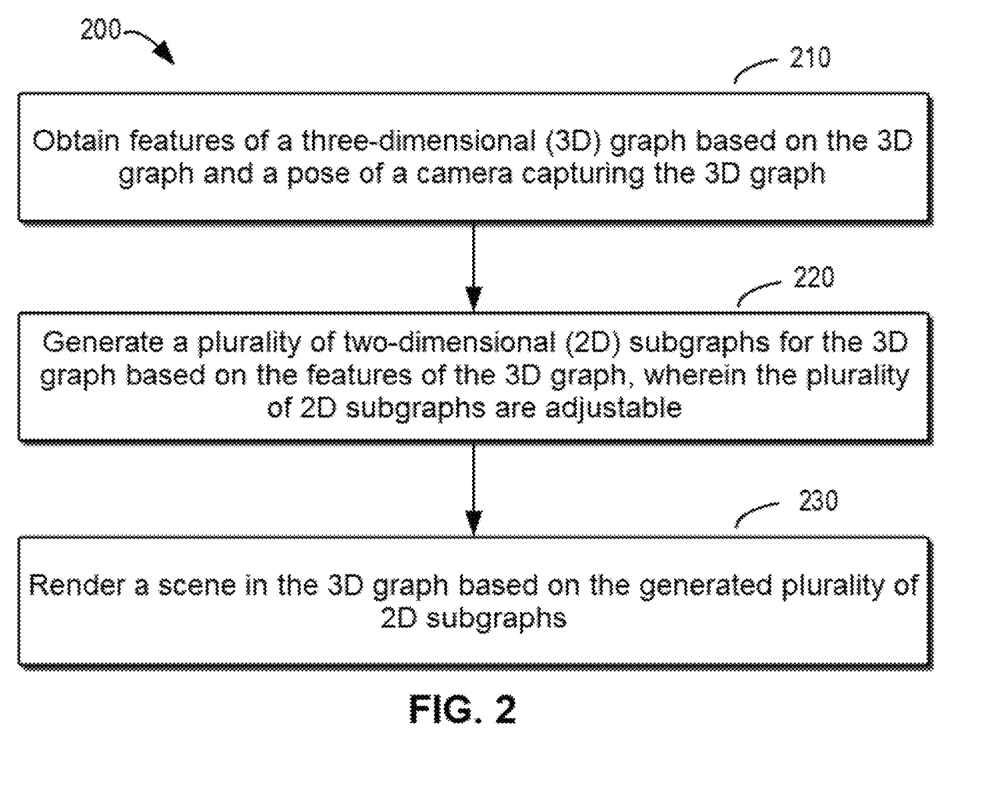
FIG. 2 is a flow chart of a method for rendering according to an illustrative embodiment of the present disclosure.

FIG. 2 shows a flow chart of the method 200 for rendering according to an embodiment of the present disclosure. In order to provide a more realistic and authentic 3D rendering, and to achieve customization of the 3D rendering process, the method 200 for rendering according to an embodiment of the present disclosure is provided.

At a block 210, features of a 3D graph 111 are obtained based on the 3D graph 111 and a pose 112 of a camera capturing the 3D graph 111. According to an embodiment of the present disclosure, the 3D graph 111 is learned based on the pose 112 (including the camera orientation and the camera posture) of the camera capturing the 3D graph 111, and feature extraction is performed on it, so that the features of the 3D graph 111 may be obtained. By way of example, the features of the 3D graph 111 may be 2D features. Here, the feature extraction process described at the block 210 is performed by an extractor in a rendering model according to an embodiment of the present disclosure, which will be described in detail below.

At a block 220, based on the features of the 3D graph 111, a plurality of 2D subgraphs are generated for the 3D graph 111, and the plurality of 2D subgraphs are adjustable. According to an embodiment of the present disclosure, the plurality of adjustable 2D subgraphs may be generated through a plurality of networks by performing processes such as mapping and transformation on the features of the 3D graph 111 extracted at the block 210. Each 2D subgraph in the generated plurality of 2D subgraphs corresponds to each factor in the above-mentioned plurality of factors (shadow, color, and depth) that affect rendering. In addition, at least one 2D subgraph in the generated plurality of 2D subgraphs may be adjusted, for example, in response to a user input, so that the rendering process according to an embodiment of the present disclosure can be customized. Here, a mapping process and a conversion process described at the block 220 are performed by a mapper and a converter in the rendering model according to an embodiment of the present disclosure, and such a mapper and a converter will be described in detail below.

At a block 230, a scene in the 3D graph 111 is rendered based on the generated plurality of 2D subgraphs. According to an embodiment of the present disclosure, the scene in the 3D graph 111 is rendered based on the plurality of 2D subgraphs generated at the block 220 and information from these 2D subgraphs. Here, the rendering process described at the block 230 is performed by a renderer in the rendering model according to an embodiment of the present disclosure, and the operation of such a renderer will be described in detail below.

Figure 3:
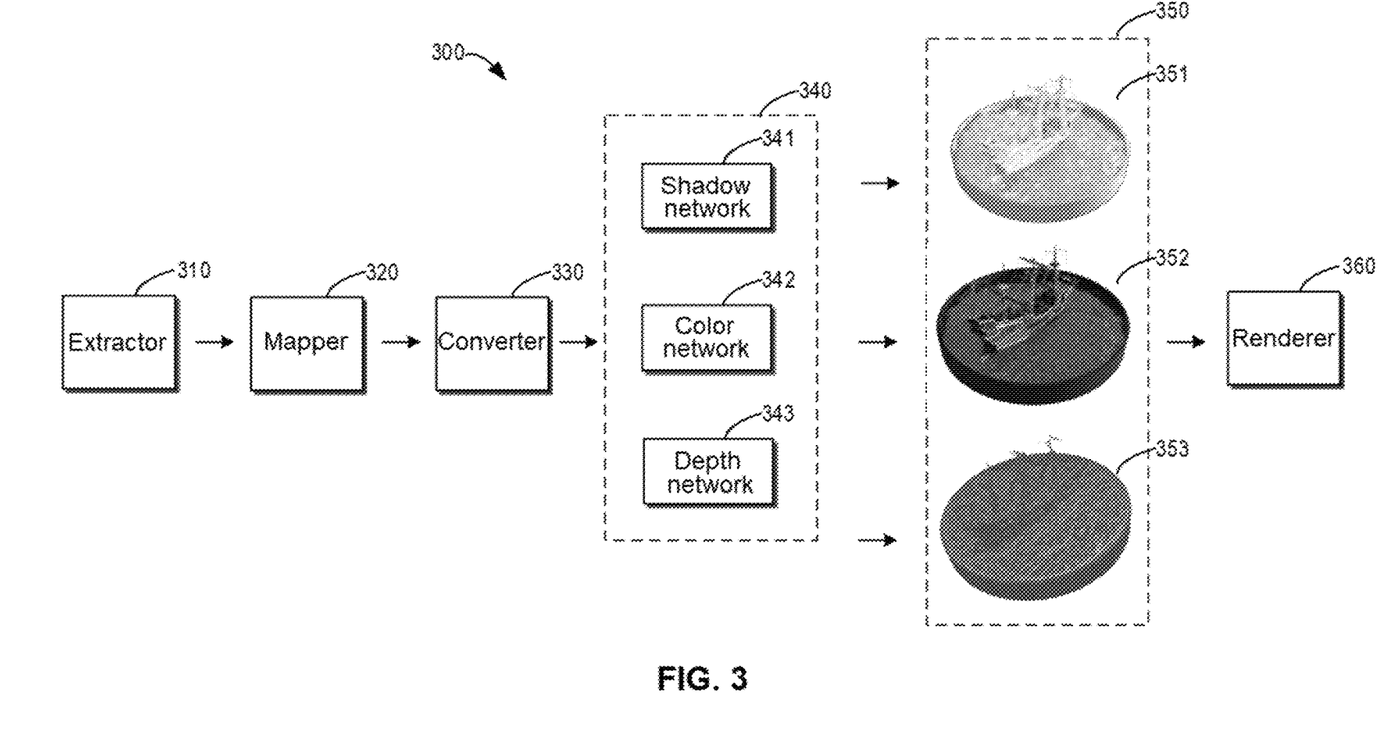
FIG. 3 is a schematic diagram of an architecture of a rendering model according to an illustrative embodiment of the present disclosure.

FIG. 3 is a schematic diagram of an architecture of a rendering model 300 according to an embodiment of the present disclosure. As exemplified in FIG. 3, the rendering model 300 according to an embodiment of the present disclosure includes an extractor 310, a mapper 320, a converter 330, a plurality of networks 340, and a renderer 360. In addition, FIG. 3 further schematically illustrates a plurality of 2D subgraphs 350 generated at the block 220 in FIG. 2.

According to an embodiment of the present disclosure, the extractor 310 may learn a 3D graph based on a pose (such as the pose 112) of a camera capturing the 3D graph (such as the 3D graph 111), so as to perform feature extraction on the 3D graph to obtain features of the 3D graph. In some embodiments, the extractor 310 may include an extractor based on a Neural Radiant Field (NeRF). NeRF has received a lot of attention in the field of 3D reconstruction due to its advantages such as simplicity and efficiency. NeRF uses differentiable volume rendering technology to sample an implicit 3D space for realistic scene reconstruction. Here, description is made by using a NeRF-based extractor as an example of the extractor 310. However, it should be understood that the extractor 310 in the present disclosure is not limited to the NeRF-based extractor, and may further include other different extractors.

In some embodiments, the extractor 310 may capture features of the 3D graph from a first perspective. The extractor 310 may obtain the features of the 3D graph from a second perspective based on the features of the 3D graph from the first perspective, the first perspective being different from the second perspective. By way of example, when observing the 3D graph, the second perspective may be the next perspective of the first perspective. In this way, the feature extraction process according to an embodiment of the present disclosure can take into account prior knowledge for a multi-perspective image, and such 3D prior knowledge is beneficial for high-quality 3D scene reconstruction. The following Formula (1) exemplifies a feature extraction process according to an embodiment of the present disclosure:

$$h_i = \alpha_i \odot \sin(w_i h_{i-1} + b_i) \tag{1}$$

wherein $w_i$ and $b_i$ are a learnable weight and a bias, respectively, for an i-th layer, $\alpha$ is a modulation variable, $h_i$ is a hidden feature, and $h_0$ is an input coordinate.

According to an embodiment of the present disclosure, the mapper 320 may map the features of the 3D graph extracted by the extractor 310. In some embodiments, the extracted features of the 3D graph may be 2D features, and the mapper 320 may include a 3D neural network. The mapper 320 maps the 2D features extracted from the 3D graph into a 3D feature map for the 3D graph. It should be understood that the descriptions of the extracted features of the 3D graph and the mapper 320 are illustrative, and the present disclosure is not limited thereto.

Furthermore, for the mapping from 2D to 3D, the mapper 320 maps the 2D features extracted by the extractor 310 from the 3D graph into a 3D shape. Next, the mapper 320 performs further processing to convert it into cube vectors, thereby obtaining a 3D feature map for the 3D graph.

According to an embodiment of the present disclosure, the converter 330 converts, based on the 3D feature map for the 3D graph and a camera posture corresponding to the 3D feature map, the 3D feature map into a target 3D feature map corresponding to a target camera posture. The converter 330 takes the 3D feature map mapped by the mapper 320 for the 3D graph as an input, and takes the camera posture corresponding to the 3D feature map as a condition. The converter 330 converts the camera posture into a six degree camera matrix. Next, the converter 330 converts the 3D feature map for the 3D graph into the target 3D feature map corresponding to the target camera posture. For sub pixels, bicubic interpolation is used for estimating features.

According to an embodiment of the present disclosure, the target 3D feature map corresponding to the target camera posture and converted by the converter 330 is mapped into a 2D feature map. In some embodiments, based on the target 3D feature map corresponding to the target camera posture, it is converted into a plurality of 2D subgraphs 350 through a plurality of networks 340. By way of example, the plurality of networks 340 may include a shadow network 341, a color network 342, and a depth network 343, and the plurality of 2D subgraphs 350 may include a 2D shadow subgraph 351, a 2D color subgraph 352, and a 2D depth subgraph 353 for the 3D graph.

According to an embodiment of the present disclosure, the plurality of 2D subgraphs 350 generated by the plurality of networks 340 are adjustable. In some embodiments, at least one of the 2D shadow subgraph 351, 2D color subgraph 352, and 2D depth subgraph 353 is adjustable, for example, in response to a user input. By way of example, the user input may include an input for a lighting direction to adjust a shadow effect of a rendered 3D graph. The generated 2D shadow subgraph 351 is adjusted to make corresponding changes to a final rendered scene.

According to an embodiment of the present disclosure, the renderer 360 renders the scene in the 3D graph based on shadow information, color information, and depth information from the 2D shadow subgraph 351, the 2D color subgraph 352, and the 2D depth subgraph 353. In some embodiments, the renderer 360 may include a Multilayer Perceptron (MLP). For example, the renderer 360 may learn red, green, and blue (RGB) values from the 2D color subgraph 352 for reconstruction.

Figure 4:
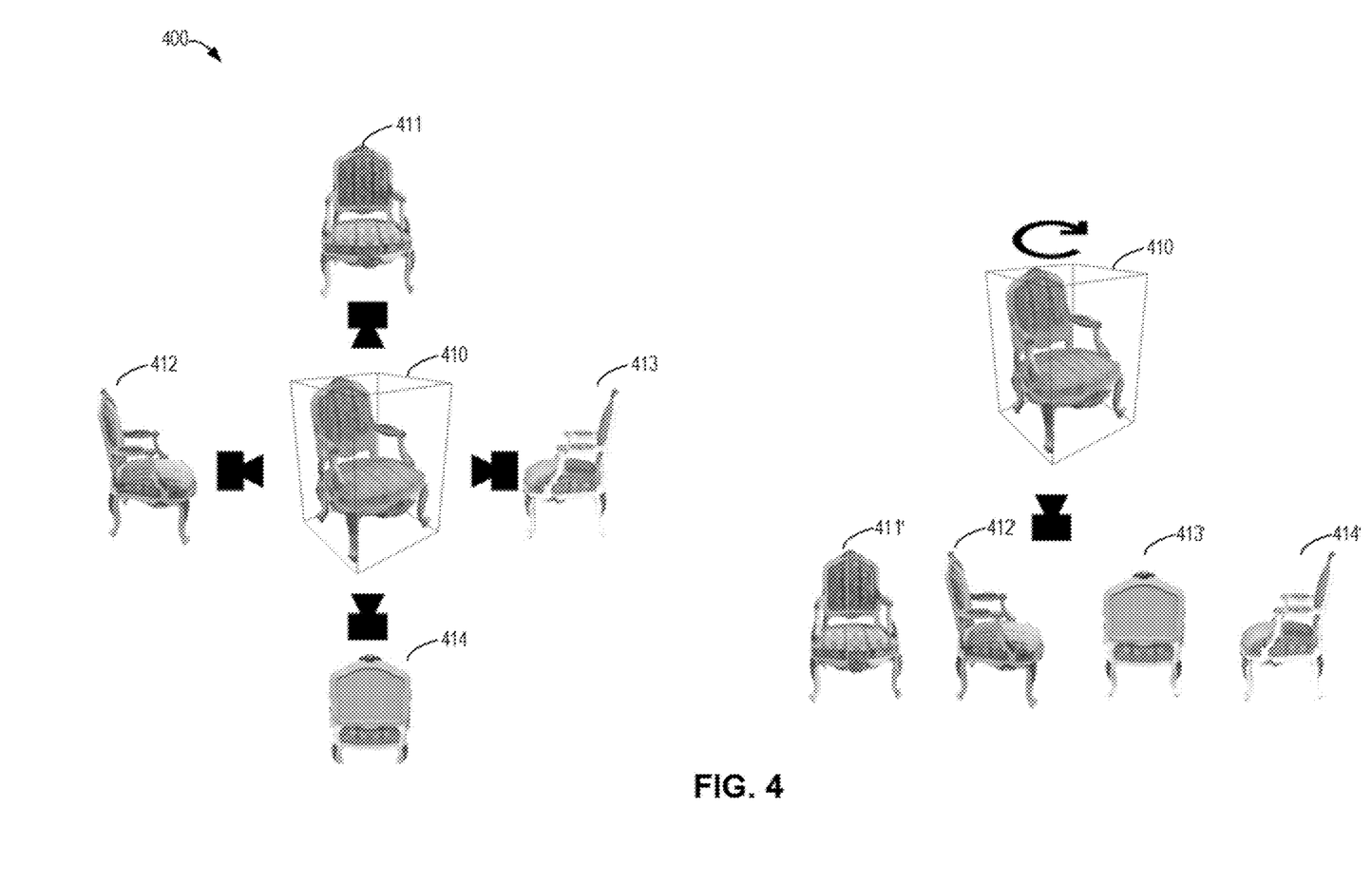
FIG. 4 is a schematic diagram of peer-to-peer perspective synthesis according to an illustrative embodiment of the present disclosure.

FIG. 4 is a schematic diagram 400 illustrating peer-to-peer perspective synthesis according to an embodiment of the present disclosure. As shown on the left in FIG. 4, a chair 410 is given, a camera may be moved around the chair 410 to capture all views, such as views 411, 412, 413, and 414 captured from different perspectives for the chair 410. Similarly, as shown on the right in FIG. 4, the position of the camera is fixed, and the chair 410 may be rotated by 360 degrees to capture views 411', 412', 413', and 414' for the chair 410 captured when the chair 410 is rotated to different angles. The following Formula (2) exemplifies the peer-to-peer perspective synthesis according to an embodiment of the present disclosure:

$$H(T_z(Z)) = T_z(H(Z)), \text{ and } H^{-1}(T_x(X)) = T_x(H^{-1}(X)) \quad (2)$$

wherein H is mapping from 3D to 2D, $T_z$ is 3D conversion, $T_x$ is 2D conversion, and $H^{-1}$ is mapping from 2D to 3D.

In other words, when learning a new view of a 3D object, rotating the object and then capturing the new view is equivalent to rotating the camera around the object and then capturing the new view. In some embodiments, in order to consider the influence of background, binary masks may be used to select regions of interest for 3D reconstruction. A training process of the rendering model 300 based on peer-to-peer perspective synthesis according to an embodiment of the present disclosure will be introduced below.

According to an embodiment of the present disclosure, sufficient training 3D graphs are given to train the rendering model 300. The 3D graph, as well as a camera orientation x=(x, y, z) and a camera posture d=(θ, φ) corresponding to the 3D graph may be input into the extractor 310 (such as but not limited to, a NeRF-based extractor) included in the rendering model 300, wherein θ and φ are an x rotation angle and a y rotation angle, respectively. Then, the extractor 310 may output the corresponding spatial density σ and RGB color c=(r, g, b). A pixel predicted color c=(r) is calculated by projecting light into the volume in a direction d starting from a camera origin o, r=o+td (t is the depth of the light), and accumulating color based on the density along the light. The extractor 310 may estimate the accumulated color by taking N point samples along the light to perform volume plotting, referring to the following Formula (3):

$$L = \sum_{r \in \mathcal{R}} \left[ \left\| \hat{C}_c(r) - C(r) \right\|_2^2 + \left\| \hat{C}_f(r) - C(r) \right\|_2^2 \right] \quad (3)$$

-continued $$\hat{C}_c(r) = \sum_{i=1}^{N_c} w_i c_i, \text{ where } w_i = T_i(1 - \exp(-\sigma_i \delta_i))$$

$$\hat{C}_f(r) = \sum_{i=1}^{N} T_i(1 - \exp(-\sigma_i \delta_i))c_i, T_i = \exp\left(-\sum_{j=1}^{i-1} \sigma_j \delta_j\right)$$

wherein $\hat{C}_c(r)$ and $\hat{C}_f(r)$ are coarse estimated color and fine estimated color, respectively, $\sigma_i$ is the volume density, and r is the camera light. Spanning the depth from a near camera plane to a far camera plane along (o, d), the depth t is selected from a uniform distribution using stratified sampling, both the density σ and the color c are modeled by using MLP, and the final rendering is trained in a self-supervised manner by using observed true per pixel colors. It is not about performing a single rendering process, but rather sampling points in a stratified manner first. Then, densities at these points are used for importance sampling in the final process. Therefore, the final model learns by monitoring rendered pixel colors of these two processes by using real colors.

According to an embodiment of the present disclosure, when the extractor 310 included in the rendering model 300 is trained, a distance from the camera position to a center of the target object may be standardized. In this way, the distance between the camera and the object is a constant and may be ignored in the calculation. In addition, the camera posture may be converted from an observer-centered perspective to an object-centered perspective. For example, the camera position T(x, d) is given, and its symmetrical camera position may be T*(x, d)=T(x, 360−d).

According to an embodiment of the present disclosure, an initial raw implementation of extractor 310 learns fixed perspectives captured in the real world. In some embodiments, Spherical Harmonic (SH) techniques may be used to decompose a scene into individual components and link these individual components together through SH coefficients. Reference is made to the following Formula (4):

$$C\left(\{x_i\}_{i=1}^{N_{depth}}, L\right) = S\left(\{x_i\}_{i=1}^{N_{depth}}, L\right) A\left(\{x_i\}_{i=1}^{N_{depth}}, L\right) \odot Lb\left(N\left(\{x_i\}_{i=1}^{N_{depth}}, L\right)\right) \quad (4)$$

In the Formula (4), $S(\{x_i\}_{i=1}^{N_{depth}}, L) \in [0,1]$ extends a second-order SH lighting model, so that it may include shadow generation for re-lighting of outdoor scenes, and this is because shadows only depend on spatial light distribution. For the color, $A(\{x_i\}_{i=1}^{N_{depth}}) \in \mathbb{R}^3$ is cumulative color generated in a manner similar to the Formula (3) above, which will not be repeated here. Also, $L \in \mathbb{R}^{9 \times 3}$ is an SH coefficient learnable by each graph, $b(\bullet) \in \mathbb{R}^9$ is an SH base, and $N(\bullet)$ is a surface normal calculated based on the accumulated light density. Reference is made to the following Formula (5):

$$N\left(\{x_i\}_{i=1}^{N_{depth}}\right) = \frac{\hat{N}\left(\{x_i\}_{i=1}^{N_{depth}}\right)}{\left\|\hat{N}\left(\{x_i\}_{i=1}^{N_{depth}}\right)\right\|^2} \text{ where} \quad (5)$$

$$\hat{N}\left(\{x_i\}_{i=1}^{N_{depth}}\right) = \sum_{i=1}^{N_{depth}} \left(\frac{\partial}{\partial x_i} \sigma(x_i)\right) \odot T(t_i) \alpha(\sigma(x_i) \delta_i)$$

An example technique for extracting the normal N involves distinguishing original x, y, and z components of densities of points on the light with respect to light samples, accumulating these components on all $N_{depth}$ (rough and lookup samples) of the light using weights $T(t_i)\alpha(\sigma(x_i)\delta_i)$, and standardizing the resulting vectors into a unit sphere. All terms in the Formula (4) are learnable, except for the SH base b(•) and a normal extraction operator N(•), which are based on a fixed explicit model. Based on the Formula (4), the shadow network, color network, and depth network may be designed as three individual MLP modules for learning corresponding scene information.

Figure 5:
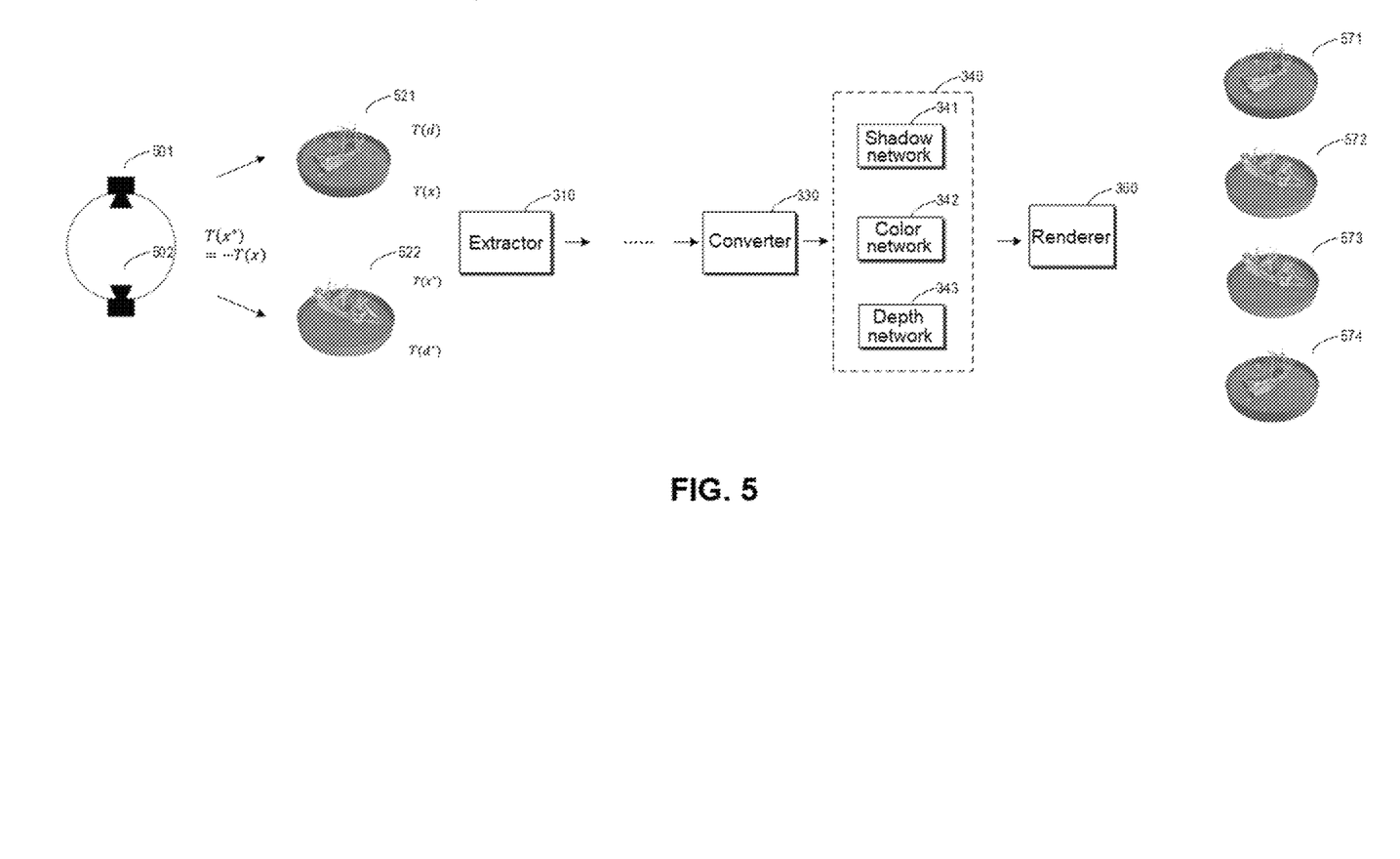
FIG. 5 is a schematic diagram of a contrast semantics perspective symmetric loss according to an illustrative embodiment of the present disclosure.

FIG. 5 is a schematic diagram 500 illustrating a contrast semantics perspective symmetric loss according to an embodiment of the present disclosure. As shown in FIG. 5, a first camera 501 is arranged in a first camera orientation (e.g., T(x)), and a second camera 502 is arranged in a second camera orientation (e.g., T(x*)), where the first camera orientation is opposite to the second camera orientation, that is, T(x*)=−T(x). In other words, the first camera 501 and the second camera 502 are arranged in opposite directions. The first camera 501 takes a first training 3D graph 521 in the first camera orientation with a first camera posture (e.g., T(d)), and the second camera 502 takes a second training 3D graph 522 in the second camera orientation with a second camera posture (e.g., T(d*)).

According to an embodiment of the present disclosure, the first training 3D graph 521 taken in the first camera orientation with the first camera posture and the second training 3D graph 522 taken in the second camera orientation with the second camera posture may be input into a rendering model 300 according to an embodiment of the present disclosure. Through components such as an extractor 310, a converter 330, a plurality of networks 340, and a renderer 360 included in the rendering model 300, the rendering model 300 may output a plurality of rendered 3D graphs, namely, a first rendered 3D graph 571, a second rendered 3D graph 572, a third rendered 3D graph 573, and a fourth rendered 3D graph 574.

Among the plurality of rendered 3D graphs output by the rendering model 300, the first rendered 3D graph 571 and the second rendered 3D graph 572 correspond to the first camera posture, the third rendered 3D graph 573 and the fourth rendered 3D graph 574 correspond to the second camera posture, the first rendered 3D graph 571 and the fourth rendered 3D graph 574 correspond to the first camera orientation, and the second rendered 3D graph 572 and the third rendered 3D graph 573 correspond to the second camera orientation.

According to an embodiment of the present disclosure, a loss may be generated based on the first training 3D graph 521, the second training 3D graph 522, the first rendered 3D graph 571, the second rendered 3D graph 572, the third rendered 3D graph 573, and the fourth rendered 3D graph 574. In some embodiments, the generated loss includes a first sub-loss and a second sub-loss. The first sub-loss may be generated by comparing the first training 3D graph 521 with the first rendered 3D graph 571 and the fourth rendered 3D graph 574, and the second sub-loss may be generated by comparing the second training 3D graph 522 with the second rendered 3D graph 572 and the third rendered 3D graph 573.

According to an embodiment of the present disclosure, the rendering model 300 may be trained by minimizing the generated loss. For example, various modules such as an extractor 310 and a converter 330 included in the rendering model 300 may be trained. In some embodiments, parameters of the rendering model 300 may be adjusted by minimizing the generated first sub-loss and second sub-loss. For example, parameters of various modules such as the extractor 310 and the converter 330 included in the rendering model 300 are adjusted.

According to an embodiment of the present disclosure, the first sub-loss may be generated by comparing the first training 3D graph 521 with shadow information, color information, and depth information of the first rendered 3D graph 571 and fourth rendered 3D graph 574, and the second sub-loss may be generated by comparing the second training 3D graph 522 with shadow information, color information, and depth information of the second rendered 3D graph 572 and third rendered 3D graph 573. The shadow information, color information, and depth information of the rendered 3D graph are obtained through the shadow network 341, the color network 342, and the depth network 343 among the plurality of networks 340.

According to an embodiment of the present disclosure, a loss function of contrast semantics perspective symmetric loss is shown in the following Formula (6):

$$\mathcal{L} = \sum_{i=1,2}\sum_{j=1,2} MSE(I_i, I^*_{i-j}) + \lambda MSE(S, 1) \qquad (6)$$

wherein MSE is a Euclidean distance, and the second term of the Formula (6) regularizes shadow. The shadow network S absorbs all gray scale lighting effects that SH cannot explain. In some embodiments, in order to limit it to only learning shadows, a maximum value of regularization intensity $\lambda$ is selected so that a peak signal-to-noise ratio (PSNR) of a reconstructed graph will not be reduced.

Figure 6:
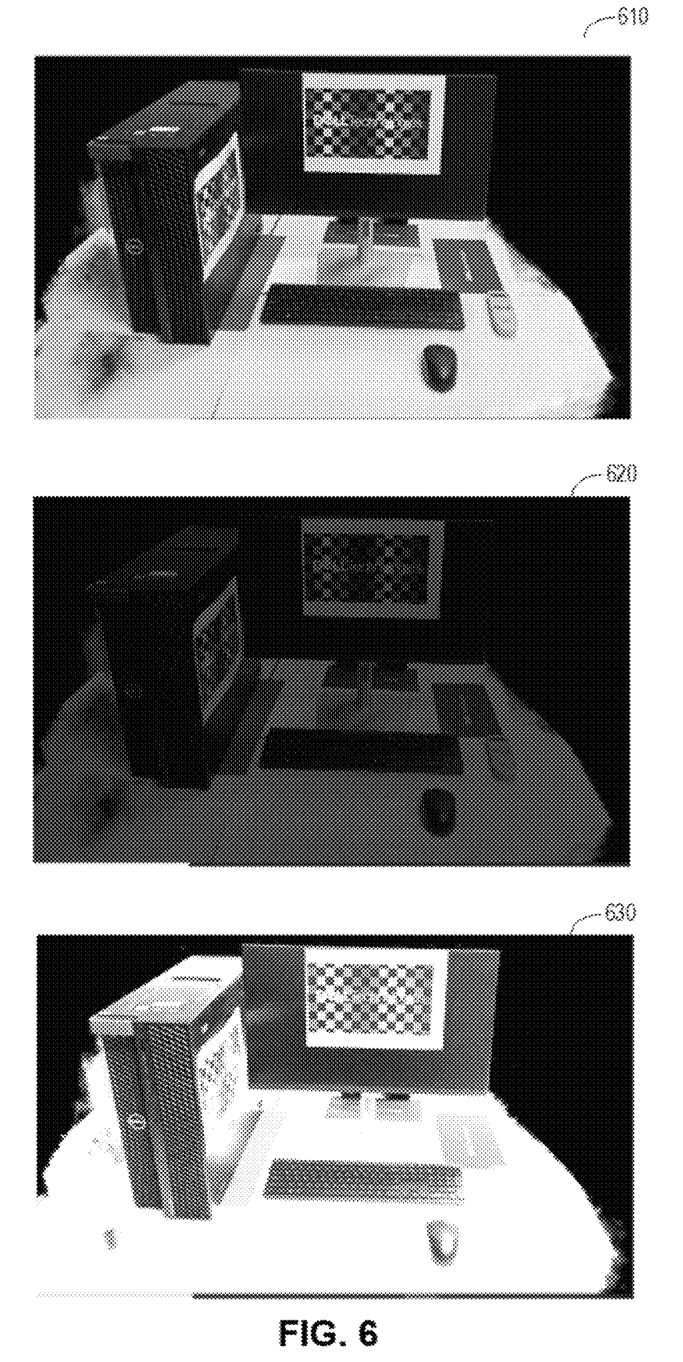
FIG. 6 is a schematic diagram of the rendering effect of a rendering process according to an illustrative embodiment of the present disclosure.

FIG. 6 is a schematic diagram of the rendering effect of an editable 3D rendering process according to an embodiment of the present disclosure. As shown in FIG. 6, a 3D graph 610 is a 3D graph of an original scene. By using the editable 3D rendering process according to an embodiment of the present disclosure, the 3D graph 610 may be reconstructed to achieve customization. In some embodiments, adjustments may be made to a plurality of 2D subgraphs of the 3D graph 610, such as adjusting one or a plurality of the 2D color subgraph, 2D shadow subgraph, and 2D depth subgraph of the 3D graph 610 to obtain a low-exposure 3D graph 620 and a high-exposure 3D graph 630, as shown in FIG. 6. It should be understood that the rendering effect shown in FIG. 6 is only illustrative, and the present disclosure is not limited to this. By using the editable 3D rendering process according to an embodiment of the present disclosure, various rendering effects may be achieved.

Figure 7:
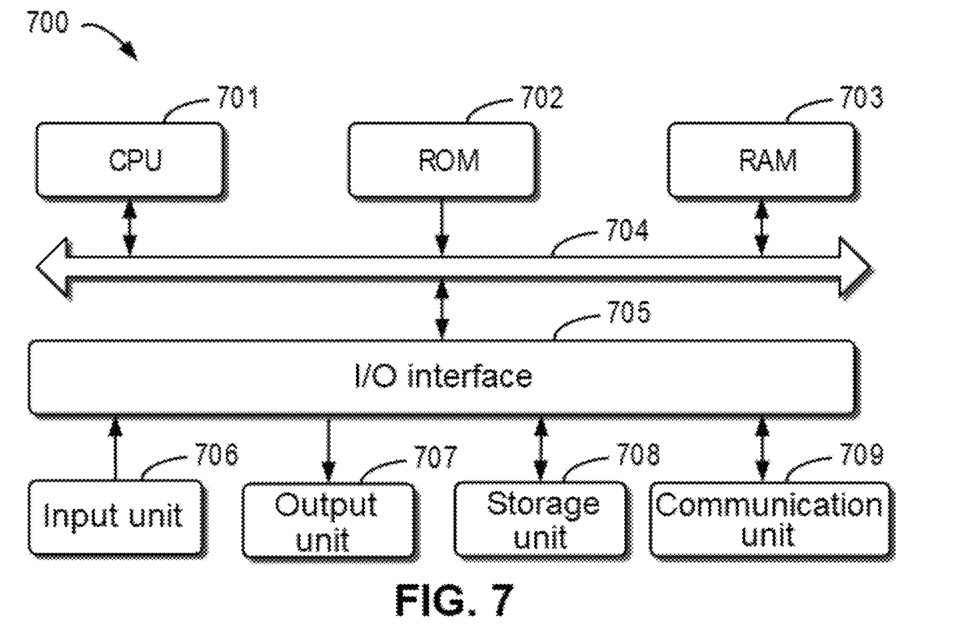
FIG. 7 is a block diagram of an example device that may be used for implementing an illustrative embodiment according to the present disclosure.

FIG. 7 is a block diagram of an example device 700 that may be used for implementing some embodiments according to the present disclosure. As shown FIG. 7, the device 700 includes a central processing unit (CPU) 701, which may execute various appropriate actions and processing in accordance with computer program instructions stored in a read-only memory (ROM) 702 or computer program instructions loaded from a storage unit 708 into a random access memory (RAM) 703. Various programs and data required for the operation of the device 700 may also be stored in the RAM 703. The CPU 701, the ROM 702, and the RAM 703 are connected to each other through a bus 704. An input/output (I/O) interface 705 is also connected to the bus 704.

A plurality of components in the device 700 are connected to an I/O interface 705, including: an input unit 706, such as a keyboard and a mouse; an output unit 707, such as various types of displays and speakers; a storage unit 708, such as a magnetic disk and an optical disc; and a communication unit 709, such as a network card, a modem, and a wireless communication transceiver. The communication unit 709 allows the device 700 to exchange information/data with other devices via a computer network such as the Internet and/or various telecommunication networks.

The various processes and processing described above, such as the method 200, may be performed by the CPU 701. For example, in some embodiments, the method 200 may be implemented as a computer software program that is tangibly included in a machine-readable medium such as the storage unit 708. In some embodiments, part or all of the computer program may be loaded and/or installed onto the device 700 via the ROM 702 and/or the communication unit 709. When the computer program is loaded into the RAM 703 and executed by the CPU 701, one or more actions of the method 200 described above may be executed.

Illustrative embodiments of the present disclosure include a method, an apparatus, a system, and/or a computer program product. The computer program product may include a computer-readable storage medium on which computer-readable program instructions for performing various aspects of the present disclosure are loaded.

The computer-readable storage medium may be a tangible device that may retain and store instructions used by an instruction-executing device. For example, the computer-readable storage medium may be, but is not limited to, an electric storage device, a magnetic storage device, an optical storage device, an electromagnetic storage device, a semiconductor storage device, or any suitable combination of the foregoing. More specific examples (a non-exhaustive list) of the computer-readable storage medium include: a portable computer disk, a hard disk, a RAM, a ROM, an erasable programmable read-only memory (EPROM or flash memory), a static random access memory (SRAM), a portable compact disc read-only memory (CD-ROM), a digital versatile disc (DVD), a memory stick, a floppy disk, a mechanical encoding device, for example, a punch card or a raised structure in a groove with instructions stored thereon, and any suitable combination of the foregoing. The computer-readable storage medium used herein is not to be interpreted as transient signals per se, such as radio waves or other freely propagating electromagnetic waves, electromagnetic waves propagating through waveguides or other transmission media (e.g., light pulses through fiber-optic cables), or electrical signals transmitted through electrical wires.

The computer-readable program instructions described herein may be downloaded from a computer-readable storage medium to various computing/processing devices, or downloaded to an external computer or external storage device via a network, such as the Internet, a local area network, a wide area network, and/or a wireless network. The network may include copper transmission cables, fiber optic transmission, wireless transmission, routers, firewalls, switches, gateway computers, and/or edge servers. A network adapter card or network interface in each computing/processing device receives computer-readable program instructions from a network and forwards the computer-readable program instructions for storage in a computer-readable storage medium in each computing/processing device.

The computer program instructions for executing the operation of the present disclosure may be assembly instructions, instruction set architecture (ISA) instructions, machine instructions, machine-dependent instructions, microcode, firmware instructions, status setting data, or source code or object code written in any combination of one or a plurality of programming languages, the programming languages including object-oriented programming languages such as Smalltalk and C++, and conventional procedural programming languages such as the C language or similar programming languages. The computer-readable program instructions may be executed entirely on a user computer, partly on a user computer, as a stand-alone software package, partly on a user computer and partly on a remote computer, or entirely on a remote computer or a server. In a case where a remote computer is involved, the remote computer can be connected to a user computer through any kind of networks, including a local area network (LAN) or a wide area network (WAN), or can be connected to an external computer (for example, connected through the Internet using an Internet service provider). In some embodiments, an electronic circuit, such as a programmable logic circuit, a field programmable gate array (FPGA), or a programmable logic array (PLA), is customized by utilizing status information of the computer-readable program instructions. The electronic circuit may execute the computer-readable program instructions so as to implement various aspects of the present disclosure.

Various aspects of the present disclosure are described herein with reference to flow charts and/or block diagrams of the method, the apparatus (system), and the computer program product according to embodiments of the present disclosure. It should be understood that each block of the flow charts and/or the block diagrams and combinations of blocks in the flow charts and/or the block diagrams may be implemented by computer-readable program instructions.

These computer-readable program instructions may be provided to a processing unit of a general-purpose computer, a special-purpose computer, or a further programmable data processing apparatus, thereby producing a machine, such that these instructions, when executed by the processing unit of the computer or the further programmable data processing apparatus, produce means for implementing functions/actions specified in one or a plurality of blocks in the flow charts and/or block diagrams. These computer-readable program instructions may also be stored in a computer-readable storage medium, and these instructions cause a computer, a programmable data processing apparatus, and/or other devices to operate in a specific manner; and thus the computer-readable medium having instructions stored includes an article of manufacture that includes instructions that implement various aspects of the functions/actions specified in one or more blocks in the flow charts and/or block diagrams.

The computer-readable program instructions may also be loaded to a computer, a further programmable data processing apparatus, or a further device, so that a series of operating steps may be performed on the computer, the further programmable data processing apparatus, or the further device to produce a computer-implemented process, such that the instructions executed on the computer, the further programmable data processing apparatus, or the further device may implement the functions/actions specified in one or a plurality of blocks in the flow charts and/or block diagrams.

The flow charts and block diagrams in the drawings illustrate the architectures, functions, and operations of possible implementations of the systems, methods, and computer program products according to various embodiments of the present disclosure. In this regard, each block in the flow charts or block diagrams may represent a module, a program segment, or part of an instruction, the module, program segment, or part of an instruction including one or a plurality of executable instructions for implementing specified logical functions. In some alternative implementations, functions marked in the blocks may also occur in an order different from that marked in the accompanying drawings. For example, two successive blocks may actually be executed in parallel substantially, and sometimes they may also be executed in a reverse order, which depends on involved functions. It should be further noted that each block in the block diagrams and/or flow charts as well as a combination of blocks in the block diagrams and/or flow charts may be implemented using a dedicated hardware-based system that executes specified functions or actions, or using a combination of special hardware and computer instructions.

Various embodiments of the present disclosure have been described above. The above description is illustrative, rather than exhaustive, and is not limited to the disclosed various embodiments. Numerous modifications and alterations will be apparent to persons of ordinary skill in the art without departing from the scope and spirit of the illustrated embodiments. The selection of terms used herein is intended to best explain the principles and practical applications of the various embodiments and their associated technical improvements, so as to enable persons of ordinary skill in the art to understand the embodiments disclosed herein.

What is claimed is:

1. A method for rendering, comprising:
   obtaining features of a three-dimensional (3D) graph based on the 3D graph and a pose of a camera capturing the 3D graph;
   generating a plurality of two-dimensional (2D) subgraphs for the 3D graph based on the features of the 3D graph, wherein the plurality of 2D subgraphs comprise at least a 2D shadow subgraph, a 2D color subgraph, and a 2D depth subgraph, and at least one of the plurality of 2D subgraphs is adjustable; and
   rendering a scene in the 3D graph based on the generated plurality of 2D subgraphs.

2. The method according to claim 1, wherein obtaining the features of the 3D graph comprises:
   obtaining features of the 3D graph from a first perspective; and
   obtaining, based on the features of the 3D graph from the first perspective, features of the 3D graph from a second perspective, the first perspective being different from the second perspective.

3. The method according to claim 1, wherein
   at least one of the 2D shadow subgraph, the 2D color subgraph, and the 2D depth subgraph is adjusted based on a user input, and the user input comprises an input for a lighting direction.

4. The method according to claim 1, wherein the features for the 3D graph comprise 2D features for the 3D graph, and the method further comprises:
   mapping the 2D features for the 3D graph into a 3D feature map for the 3D graph; and
   converting, based on the 3D feature map for the 3D graph and a camera posture corresponding to the 3D feature map, the 3D feature map into a target 3D feature map corresponding to a target camera posture; and
   mapping the target 3D feature map corresponding to the target camera posture into a target 2D feature map.

5. The method according to claim 4, further comprising:
   obtaining, based on the target 2D feature map, the 2D shadow subgraph, the 2D color subgraph, and the 2D depth subgraph through a shadow network, a color network, and a depth network; and
   rendering the scene in the 3D graph based on shadow information, color information, and depth information from the obtained 2D shadow subgraph, 2D color subgraph, and 2D depth subgraph.

6. The method according to claim 4, wherein obtaining the 2D features of the 3D graph is performed by an extractor, and converting the 3D feature map into a target 3D feature map corresponding to the target camera posture is performed by a converter, and generating the extractor and the converter comprises:
   obtaining a first rendered 3D graph, a second rendered 3D graph, a third rendered 3D graph, and a fourth rendered 3D graph based on a first training 3D graph taken at a first camera orientation in a first camera posture and a second training 3D graph taken at a second camera orientation in a second camera posture, wherein the first camera orientation is opposite to the second camera orientation, the first rendered 3D graph and the second rendered 3D graph correspond to the first camera posture, the third rendered 3D graph and the fourth rendered 3D graph correspond to the second camera posture, the first rendered 3D graph and the fourth rendered 3D graph correspond to the first camera orientation, and the second rendered 3D graph and the third rendered 3D graph correspond to the second camera orientation;
   generating a loss based on the first training 3D graph, the second training 3D graph, the first rendered 3D graph, the second rendered 3D graph, the third rendered 3D graph, and the fourth rendered 3D graph; and
   training the extractor and the converter based on the loss.

7. The method according to claim 6, wherein the loss comprises a first sub-loss and a second sub-loss, and training of the extractor and the converter comprises:
   generating the first sub-loss by comparing the first training 3D graph with the first rendered 3D graph and the fourth rendered 3D graph;
   generating the second sub-loss by comparing the second training 3D graph with the second rendered 3D graph and the third rendered 3D graph; and
   adjusting parameter sets of the extractor and the converter by minimizing the first sub-loss and the second sub-loss.

8. The method according to claim 7, wherein:
   the first sub-loss is generated by comparing shadow information, color information, and depth information of the first training 3D graph with those of the first rendered 3D graph and the fourth rendered 3D graph; and
   the second sub-loss is generated by comparing shadow information, color information, and depth information of the second training 3D graph with those of the second rendered 3D graph and the third rendered 3D graph.

9. An electronic device, comprising:
   at least one processor; and
   memory coupled to the at least one processor and storing instructions, wherein the instructions, when executed by the at least one processor, cause the electronic device to perform actions comprising:
   obtaining features of a three-dimensional (3D) graph based on the 3D graph and a pose of a camera capturing the 3D graph;
   generating a plurality of two-dimensional (2D) subgraphs for the 3D graph based on the features of the 3D graph, wherein the plurality of 2D subgraphs comprise at least a 2D shadow subgraph, a 2D color subgraph, and a 2D depth subgraph, and at least one of the plurality of 2D subgraphs is adjustable; and rendering a scene in the 3D graph based on the generated plurality of 2D subgraphs.

10. The electronic device according to claim 9, wherein obtaining the features of the 3D graph comprises:
obtaining features of the 3D graph from a first perspective; and
obtaining, based on the features of the 3D graph from the first perspective, features of the 3D graph from a second perspective, the first perspective being different from the second perspective.

11. The electronic device according to claim 9, wherein at least one of the 2D shadow subgraph, the 2D color subgraph, and the 2D depth subgraph is adjusted based on a user input, and the user input comprises an input for a lighting direction.

12. The electronic device according to claim 9, wherein the features for the 3D graph comprise 2D features for the 3D graph, and the actions further comprise:
mapping the 2D features for the 3D graph into a 3D feature map for the 3D graph; and
converting, based on the 3D feature map for the 3D graph and a camera posture corresponding to the 3D feature map, the 3D feature map into a target 3D feature map corresponding to a target camera posture; and
mapping the target 3D feature map corresponding to the target camera posture into a target 2D feature map.

13. The electronic device according to claim 12, wherein the actions further comprise:
obtaining, based on the target 2D feature map, the 2D shadow subgraph, the 2D color subgraph, and the 2D depth subgraph through a shadow network, a color network, and a depth network; and
rendering the scene in the 3D graph based on shadow information, color information, and depth information from the obtained 2D shadow subgraph, 2D color subgraph, and 2D depth subgraph.

14. The electronic device according to claim 12, wherein obtaining the 2D features of the 3D graph is performed by an extractor, and converting the 3D feature map into a target 3D feature map corresponding to the target camera posture is performed by a converter, and generating the extractor and the converter comprises:
obtaining a first rendered 3D graph, a second rendered 3D graph, a third rendered 3D graph, and a fourth rendered 3D graph based on a first training 3D graph taken at a first camera orientation in a first camera posture and a second training 3D graph taken at a second camera orientation in a second camera posture, wherein the first camera orientation is opposite to the second camera orientation, the first rendered 3D graph and the second rendered 3D graph correspond to the first camera posture, the third rendered 3D graph and the fourth rendered 3D graph correspond to the second camera posture, the first rendered 3D graph and the fourth rendered 3D graph correspond to the first camera orientation, and the second rendered 3D graph and the third rendered 3D graph correspond to the second camera orientation;
generating a loss based on the first training 3D graph, the second training 3D graph, the first rendered 3D graph, the second rendered 3D graph, the third rendered 3D graph, and the fourth rendered 3D graph; and
training the extractor and the converter based on the loss.

15. The electronic device according to claim 14, wherein the loss comprises a first sub-loss and a second sub-loss, and training of the extractor and the converter comprises:
generating the first sub-loss by comparing the first training 3D graph with the first rendered 3D graph and the fourth rendered 3D graph;
generating the second sub-loss by comparing the second training 3D graph with the second rendered 3D graph and the third rendered 3D graph; and
adjusting parameter sets of the extractor and the converter by minimizing the first sub-loss and the second sub-loss.

16. The electronic device according to claim 15, wherein:
the first sub-loss is generated by comparing shadow information, color information, and depth information of the first training 3D graph with those of the first rendered 3D graph and the fourth rendered 3D graph; and
the second sub-loss is generated by comparing shadow information, color information, and depth information of the second training 3D graph with those of the second rendered 3D graph and the third rendered 3D graph.

17. A computer program product, the computer program product being tangibly stored on a non-transitory computer-readable storage medium and comprising computer-executable instructions, wherein the computer-executable instructions, when executed by a computer, cause the computer to perform actions comprising:
obtaining features of a three-dimensional (3D) graph based on the 3D graph and a pose of a camera capturing the 3D graph;
generating a plurality of two-dimensional (2D) subgraphs for the 3D graph based on the features of the 3D graph, wherein the plurality of 2D subgraphs comprise at least a 2D shadow subgraph, a 2D color subgraph, and a 2D depth subgraph, and at least one of the plurality of 2D subgraphs is adjustable; and
rendering a scene in the 3D graph based on the generated plurality of 2D subgraphs.

18. The computer program product according to claim 17, wherein the features for the 3D graph comprise 2D features for the 3D graph, and the actions further comprise:
mapping the 2D features for the 3D graph into a 3D feature map for the 3D graph; and
converting, based on the 3D feature map for the 3D graph and a camera posture corresponding to the 3D feature map, the 3D feature map into a target 3D feature map corresponding to a target camera posture; and
mapping the target 3D feature map corresponding to the target camera posture into a target 2D feature map.

19. The computer program product according to claim 18, wherein obtaining the 2D features of the 3D graph is performed by an extractor, and converting the 3D feature map into a target 3D feature map corresponding to the target camera posture is performed by a converter, and generating the extractor and the converter comprises:
obtaining a first rendered 3D graph, a second rendered 3D graph, a third rendered 3D graph, and a fourth rendered 3D graph based on a first training 3D graph taken at a first camera orientation in a first camera posture and a second training 3D graph taken at a second camera orientation in a second camera posture, wherein the first camera orientation is opposite to the second camera orientation, the first rendered 3D graph and the second rendered 3D graph correspond to the first camera posture, the third rendered 3D graph and the fourth rendered 3D graph correspond to the second camera posture, the first rendered 3D graph and the fourth rendered 3D graph correspond to the first camera orientation, and the second rendered 3D graph and the third rendered 3D graph correspond to the second camera orientation;

generating a loss based on the first training 3D graph, the second training 3D graph, the first rendered 3D graph, the second rendered 3D graph, the third rendered 3D graph, and the fourth rendered 3D graph; and training the extractor and the converter based on the loss.

20. The computer program product according to claim 19, wherein the loss comprises a first sub-loss and a second sub-loss, and training of the extractor and the converter comprises:

generating the first sub-loss by comparing the first training 3D graph with the first rendered 3D graph and the fourth rendered 3D graph;

generating the second sub-loss by comparing the second training 3D graph with the second rendered 3D graph and the third rendered 3D graph; and adjusting parameter sets of the extractor and the converter by minimizing the first sub-loss and the second sub-loss.

* * * * *